US012507606B2

(12) United States Patent
Beschorn et al.

(10) Patent No.: US 12,507,606 B2
(45) Date of Patent: Dec. 30, 2025

(54) AGRICULTURAL MACHINE WITH VIBRATION-DAMPENED ATTACHMENT

(71) Applicant: CLAAS Selbstfahrende Erntemaschinen GmbH, Harsewinkel (DE)

(72) Inventors: Udo Beschorn, Harsewinkel (DE); Andreas Wielenberg, Herford (DE); Christian Füchtling, Rinkerode (DE); Marcus Gehrmann, Marienfeld (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 764 days.

(21) Appl. No.: 17/866,766

(22) Filed: Jul. 18, 2022

(65) Prior Publication Data

US 2023/0030760 A1  Feb. 2, 2023

(30) Foreign Application Priority Data

Jul. 30, 2021 (DE) .......................... 102021119897.6

(51) Int. Cl.
*A01B 63/10* (2006.01)
*A01B 73/00* (2006.01)
*A01D 41/127* (2006.01)
*A01D 41/14* (2006.01)
(Continued)

(52) U.S. Cl.
CPC .......... *A01B 63/1006* (2013.01); *A01B 73/00* (2013.01); *A01D 41/127* (2013.01); *A01D 41/141* (2013.01); *A01D 41/142* (2013.01); *A01B 63/108* (2013.01);
(Continued)

(58) Field of Classification Search
CPC ... A01B 63/1006; A01B 63/108; A01B 73/00; A01B 79/005; A01D 41/127; A01D 41/141; A01D 41/142; B60G 2300/08; B60G 2400/61
See application file for complete search history.

(56) References Cited

U.S. PATENT DOCUMENTS 2,750,727 A * 6/1956 Wright ................. A01D 41/141
116/DIG. 13
3,566,587 A * 3/1971 Janssen ................ A01D 41/141
56/DIG. 15
(Continued)

OTHER PUBLICATIONS

European Search Report for European patent application No. 22167051.6-1105 mailed Jul. 10, 2022.

*Primary Examiner* — Arpad Fabian-Kovacs
(74) *Attorney, Agent, or Firm* — Lempia Summerfield Katz LLC

(57) ABSTRACT

An agricultural machine comprises a carrier vehicle and an attachment is disclosed. The attachment is pivotably guided on the carrier vehicle about an axis extending in the direction of travel of the carrier vehicle. To the right and left of the axis, a support wheel is connected to the attachment via a damped, compressible arm. A control circuit is configured to decide whether a pivoting motion of the attachment about the axis is or is not desirable and, in the case that the pivoting motion is desirable, the arm that is compressed by the pivoting motion is switched from a strongly dampened compressible state to a substantially undampened state.

20 Claims, 4 Drawing Sheets

(51) Int. Cl.
  *A01B 63/108* (2006.01)
  *A01B 79/00* (2006.01)
(52) U.S. Cl.
  CPC ........ *A01B 79/005* (2013.01); *B60G 2300/08* (2013.01); *B60G 2400/61* (2013.01)

(56) References Cited

U.S. PATENT DOCUMENTS

| | | | | |
|---|---|---|---|---|
| 3,597,907 | A * | 8/1971 | Neal | A01D 34/246 |
| | | | | 56/DIG. 15 |
| 4,594,840 | A * | 6/1986 | D'Almeida | A01D 41/141 |
| | | | | 56/11.2 |
| 5,359,836 | A * | 11/1994 | Zeuner | A01D 41/141 |
| | | | | 56/208 |
| 5,471,825 | A * | 12/1995 | Panoushek | A01D 41/141 |
| | | | | 56/DIG. 3 |
| 5,704,200 | A * | 1/1998 | Chmielewski, Jr. | |
| | | | | A01D 41/141 |
| | | | | 56/DIG. 15 |
| 5,713,190 | A * | 2/1998 | Vermeulen | A01D 41/141 |
| | | | | 56/DIG. 15 |
| 6,681,551 | B1 * | 1/2004 | Sheidler | A01B 63/108 |
| | | | | 56/10.2 G |
| 6,789,379 | B2 * | 9/2004 | Heidjann | A01D 41/12 |
| | | | | 56/10.2 E |
| 10,278,330 | B2 | 5/2019 | Silver et al. | |
| 10,321,629 | B2 | 6/2019 | Talbot et al. | |
| 10,531,607 | B2 | 1/2020 | Schroeder et al. | |
| 2003/0019197 | A1 * | 1/2003 | Heidjann | A01D 41/12 |
| | | | | 56/14.7 |
| 2011/0283673 | A1 | 11/2011 | Moersch et al. | |
| 2015/0033692 | A1 | 2/2015 | Schroeder et al. | |
| 2018/0070531 | A1 * | 3/2018 | Long | A01D 34/006 |
| 2019/0230855 | A1 * | 8/2019 | Reed | A01B 69/004 |
| 2021/0153434 | A1 | 5/2021 | Hunt | |
| 2022/0174873 | A1 | 6/2022 | Topmöller et al. | |
| 2023/0030760 | A1 * | 2/2023 | Beschorn | A01D 41/141 |

\* cited by examiner

AGRICULTURAL MACHINE WITH VIBRATION-DAMPENED ATTACHMENT

CROSS REFERENCE TO RELATED APPLICATION

This application claims priority under 35 U.S.C. § 119 to German Patent Application No. DE 102021119897.6 filed Jul. 30, 2021, the entire disclosure of which is hereby incorporated by reference herein.

TECHNICAL FIELD

The invention relates to an agricultural production machine with a carrier vehicle (such as a combine or forage harvester) and an attachment mounted thereupon (such as a cutting unit).

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

An agricultural production machine with a carrier vehicle (interchangeably termed an agricultural carrier vehicle), such as a combine or a forage harvester, may have an attachment mounted thereupon, such as a cutting unit. In general, such a cutting unit is suspended in the middle on an infeed of the carrier vehicle and may pivot about an axis oriented in the direction of travel of the carrier vehicle so that the cutting unit does not have to follow each rolling movement about this axis that the carrier vehicle performs when traveling over uneven ground so that it may maintain an orientation that is substantially parallel to the ground despite the carrier vehicle briefly swinging back and forth. Instead, the roll angle of the cutting unit may simultaneously adapt to uneven ground without the carrier vehicle having to perform a corresponding rolling movement. To allow the cutting unit to move in this way, a swivel drive is provided between the carrier vehicle and attachment.

US Patent Application Publication No. 2011/0283673 A1, incorporated by reference herein in its entirety, discloses a production machine in which support wheels on both sides of the axle are connected to a frame of the cutting unit via reversibly flexible supports. If one of these support wheels rolls over an elevation in the ground and is deflected upward, the high moment of inertia of the cutting unit basically causes just the support of this one support wheel to give way, and the roll angle of the cutting unit remains unchanged. Whereas this makes a great deal of sense for small elevations, the problem with larger ones is that the cutting unit may strike the elevation when the roll angle is not adapted. Adapting the roll angle counteracts both the moment of inertia of the cutting unit as well as the resistance of the support wheel carrier on a side of the cutting unit facing away from the ground elevation.

BRIEF DESCRIPTION OF THE DRAWINGS

The present application is further described in the detailed description which follows, in reference to the noted drawings by way of non-limiting examples of exemplary implementation, in which like reference numerals represent similar parts throughout the several views of the drawings, and wherein.

DETAILED DESCRIPTION

Figure 1:
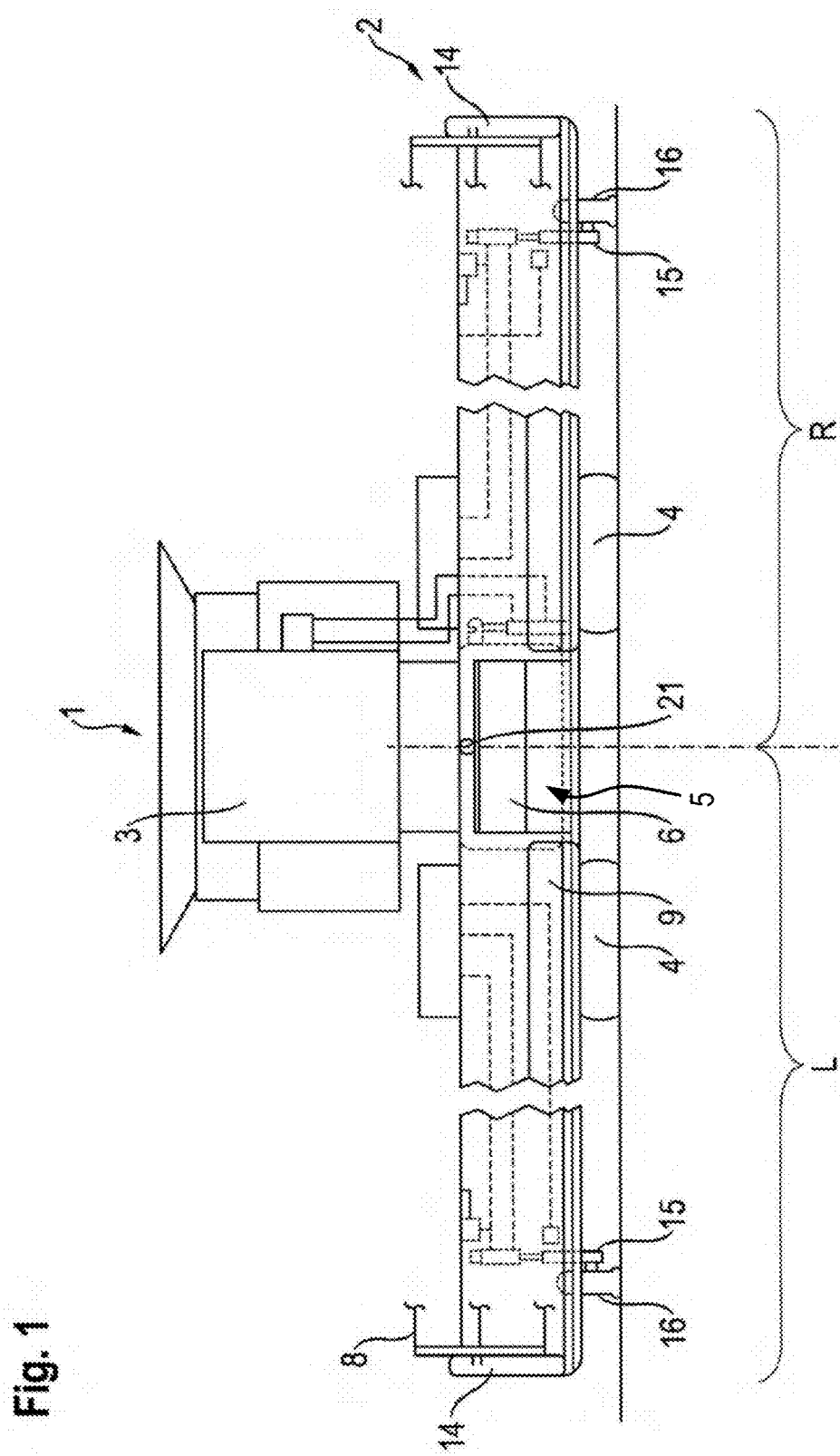
FIG. 1 illustrates a schematic view of an agricultural machine according to the invention from the front.

As discussed in the background, a production machine may include support wheels on both sides of the axle that are connected to a frame of the cutting unit via reversibly flexible supports. If one of these support wheels rolls over an elevation in the ground and is deflected upward, the high moment of inertia of the cutting unit basically causes just the support of this one support wheel to give way, and the roll angle of the cutting unit remains unchanged. This configuration makes a great deal of sense for certain situations, such as small elevations. However, a problem arises with larger elevations in that the cutting unit may strike the elevation when the roll angle is not adapted. Adapting the roll angle may counteract both the moment of inertia of the cutting unit as well as the resistance of the support wheel carrier on a side of the cutting unit facing away from the ground elevation.

To remedy this, in one or some embodiments, an agricultural machine is disclosed that comprises a carrier vehicle and an attachment, with the attachment being pivotably guided on the carrier vehicle about an axis extending in the direction of travel of the carrier vehicle. Further, a support wheel is connected on one or both of the left and right of the axis to the attachment via a damped compressible arm. Moreover, the agricultural machine includes a control circuit that is configured to determine whether a pivoting motion of the attachment about the axis is or is not desirable (e.g., based on an analysis of a current state of at least a part of the agricultural work machine, such as one or both of the carrier vehicle or the attachment, determining whether to perform the pivoting motion in order to at least partly modify the roll angle of the cutting unit; in one example, discussed further below, measurements from one or more ground distance meters to generate data indicative of distance to a ground, which may be used to determine whether to perform the pivoting motion) and, in the event that it is determined that the pivoting motion is desirable, the control circuit controls at least one aspect of the agricultural machine, such as the control circuit sends a command that changes the dampening of one or both of the compressible arm (e.g., the command causes at least one arm (such as the arm opposite the arms that is compressed by the pivoting motion, so that the control circuit causes or controls the requested change) to be switched its compressible state from a strongly dampened compressible state to a substantially undampened state).

Thus, the control circuit may be configured to: receive an indication of at least one aspect of the attachment (e.g., an indicator of the roll angle, such as based on a distance of one or both side of the attachment to ground); determine, based on the indication, whether to modify operation of the attachment by changing compressibility of at least one of the compressible arms; and responsive to determining to modify operation of the attachment by changing compressibility of at least one of the compressible arms, causing the at least one of the compressible arms to change its compressible state.

More specifically, when an arm on one side of the attachment in contact with a ground elevation is compressed, the control circuit may treat the pivoting motion driven thereby as desirable by switching the opposite arm to a substantially undamped state (e.g., at least 85% undamped; at least 90% undamped; at least 95% undamped; at least 96% undamped; at least 97% undamped; at least 98% undamped; at least 99% undamped; at least 100% undamped). This other arm (switched to the substantially undamped state) therefore may no longer resist the torque exerted on the attachment by the arm compressed in contact with the ground elevation, which may allow for a faster adjustment of the roll angle.

During operation, the support wheels may contribute little or no weight to the attachment. Consequently, the torque that an arm can exert on the attachment may typically be insufficient to cause a rapid adaptation of the roll angle. To achieve this, at least one actuator may be included that acts on the carrier vehicle and attachment and is responsive to a command sent by the control circuit.

The control circuit may then usefully be configured to treat a pivoting motion of the attachment about the axis driven by the actuator as a desired pivoting motion (e.g., in a state in which the actuator drives a pivoting motion of the attachment about the axis), to switch the one of the arms which is compressed by the pivoting motion to a substantially undamped state, and thereby enabling faster pivoting. The control circuit may also control the actuator itself (e.g., via one or more control commands).

By switching the damping from the substantially undamped state to the strongly damped state (e.g., at least 85% damped; at least 90% damped; at least 95% damped; at least 96% damped; at least 97% damped; at least 98% damped; at least 99% damped; or at least 100% damped) over the course of a compressing process as part of the downward motion, rapid pivoting and therefore a rapid return to close to a desired roll angle may first be achieved; when this is done, stronger damping may prevent the attachment from contacting the ground, or at least slow it to a harmless speed.

In one or some embodiments, the control circuit may control respective arms to different damping values. For example, one, some or each arm may include a respective actuating cylinder, and a chamber of the respective actuating cylinder being connected to a reservoir via a hydraulic circuit with switchable flow resistance. In turn, the control circuit may send a command to modify operation of the respective actuating cylinder, with the commands actuating different arms in different ways resulting in different damping values for the different arms.

In one or some embodiments, the actuating cylinder comprises a single-action actuating cylinder. In one or some embodiments, the arm may include an arm element articulated to the attachment at a first end and defining an axis of the support wheel at a second end. To adjust the arm, the actuating cylinder may be articulated to the arm element and to the attachment. Other ways in which to adjust the arm are contemplated.

In one or some embodiments, the hydraulic circuit, which may be a part of or act in concert with the actuating cylinder, may include a throttling point and a switching valve parallel to the throttling point; a high damping value may therefore be achieved by closing the switching valve, and a low value may be achieved by opening the switching valve.

An open state of the switching valve may, in principle, be used to achieve a fast yielding of an arm on a respective side when one side of the attachment moves downward, as well as a fast extension of the arm when there is an upward movement. In one or some embodiments, the hydraulic circuit may further include a check valve parallel to the throttle point to realize a fast extension during an upward movement; the movement behavior of the attachment may therefore be independently optimized for both situations.

In one or some embodiments, the throttle point may include a pressure control valve controlled by the pressure at its connection facing the actuating cylinder. Accordingly, a high level of damping may be realized independent of the momentary deflection of the attachment during the phases of the movement in which the switching valve is not actuated.

In one or some embodiments, one, some or all arms are assigned or has associated with a ground distance meter in order to control the damping depending on a distance to the ground measured thereby, or depending on a difference between ground distances measured by the ground distance meters on both sides of the axis. In one or some embodiments, the ground distance meters may each include a wire hoop that extend toward the ground from the attachment and are deflected or deformed in contact with the ground, wherein the deflection or bending stress of the wire hoop is detected to provide a measurement signal representative of the ground distance. Other ground distance meters are contemplated.

In one or some embodiments, the switching valve in the hydraulic circuit of one of the arms may be configured to open when a first threshold value of the ground distance measured by the ground distance meter associated with the arm, or of the difference between the ground distance measured by the ground distance meter associated with the arm and a ground distance measured by a ground distance meter on the opposite side of the axis is exceeded, and/or to close when the ground distance or the difference falls below a second, lower threshold value. In one or some embodiments, opening over the course of an upward movement basically may remain without effect on damping if, in this case, the path through the check valve is open to the hydraulic fluid.

Referring to the figures, FIG. 1 illustrates a schematic front view of a combine that functions as a carrier vehicle 1 for an attachment 2, such as a harvesting attachment. An example combine is disclosed in US Patent Application Publication No. 2022/0174873 A1, incorporated by reference herein in its entirety. In one or some embodiments, the width of the attachment 2 is a multiple of the width of the carrier vehicle 1. The attachment 2 may cover a lower front region of the carrier vehicle 1, so that basically only a driver's cab 3 above the attachment 2 and parts of its front wheels 4 below it may be seen from the latter. The attachment 2 and carrier vehicle 1 may be connected via an inclined conveyor 5, of which only an inlet opening 6 in a rear wall of the attachment 2 may be seen in FIG. 1. In one or some embodiments, the attachment 2 is pivotable relative to the carrier vehicle 1 about an axis 21 extending in the direction of travel; the axis therefore defines a left and a right side L, R of the attachment 2 which may move up and down vertically in antiphase in the context of a rolling movement about the axis 21, but may also spring up and down in phase. A reel 8 and cross-feeding screw conveyor 9 are each shown in FIG. 1 interrupted in the middle (e.g., with the middle cut out).

Figure 2:
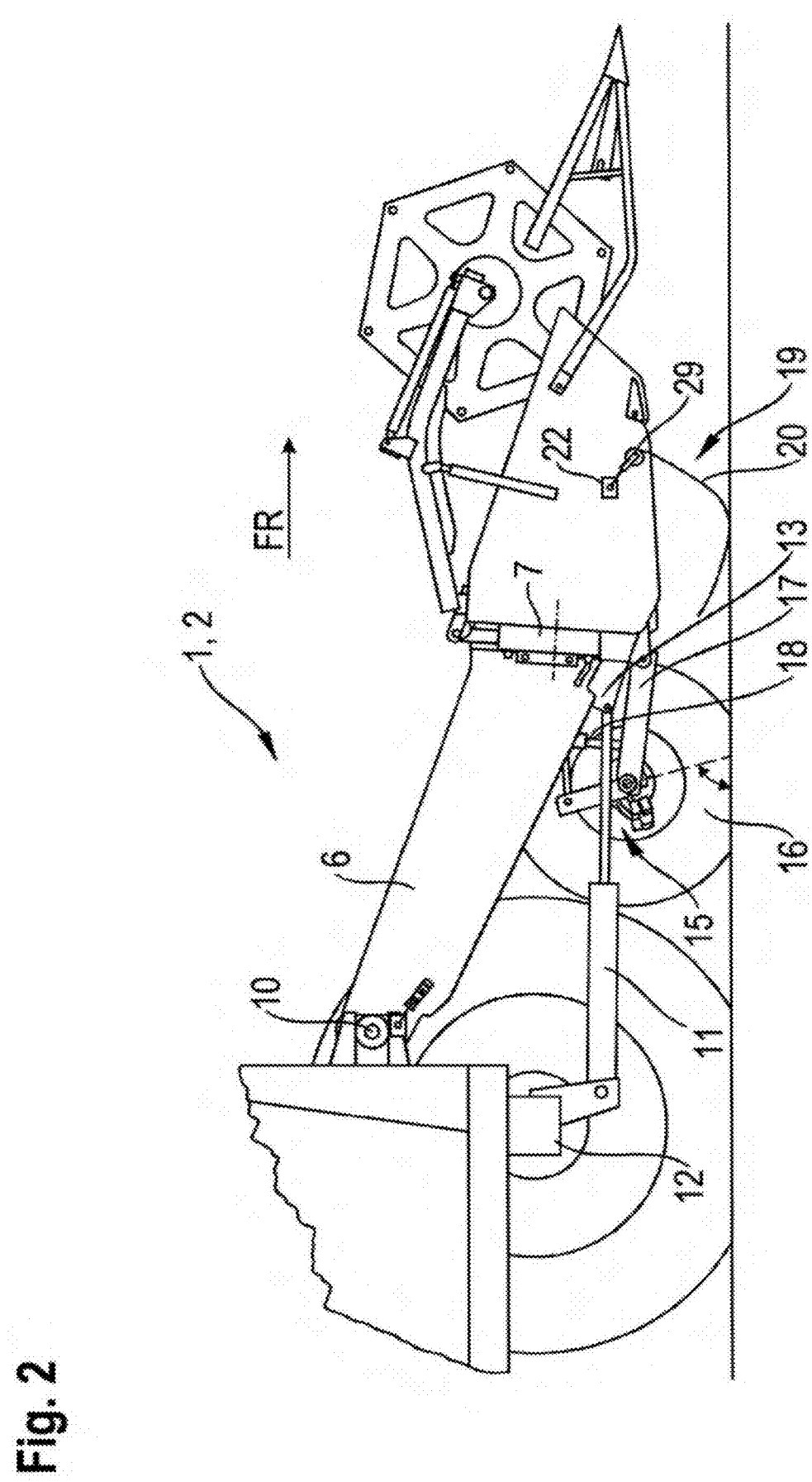
FIG. 2 illustrates a schematic side view of an attachment mounted on a carrier vehicle.

FIG. 2 illustrates details of the design of the attachment 2 and its connection to the carrier vehicle 1. A frame 7 of the cross-feeding screw conveyor 5 is swivel-connected to the body of the carrier vehicle 1 by a joint 10. Using the inclined conveyor 5, the carrier vehicle 1 may bear the majority of the weight of the attachment 2. In one or some embodiments, two actuators 11 extend between body-side contact points 12 on the body below the joint 10, and attachment-side contact points 13 that are each adjacent to the rear wall of the attachment 2 at the bottom corners of the inlet opening 6. Accordingly, simultaneous actuation of both actuators 11 in the same direction may move the attachment 2 up and down as a whole, whereas extending or retracting one of the actuators 11 at a time while maintaining the length of the other, or actuating the two actuators 11 in opposite phases, may drive or counteract a rolling motion of the attachment 2.

Figure 3:
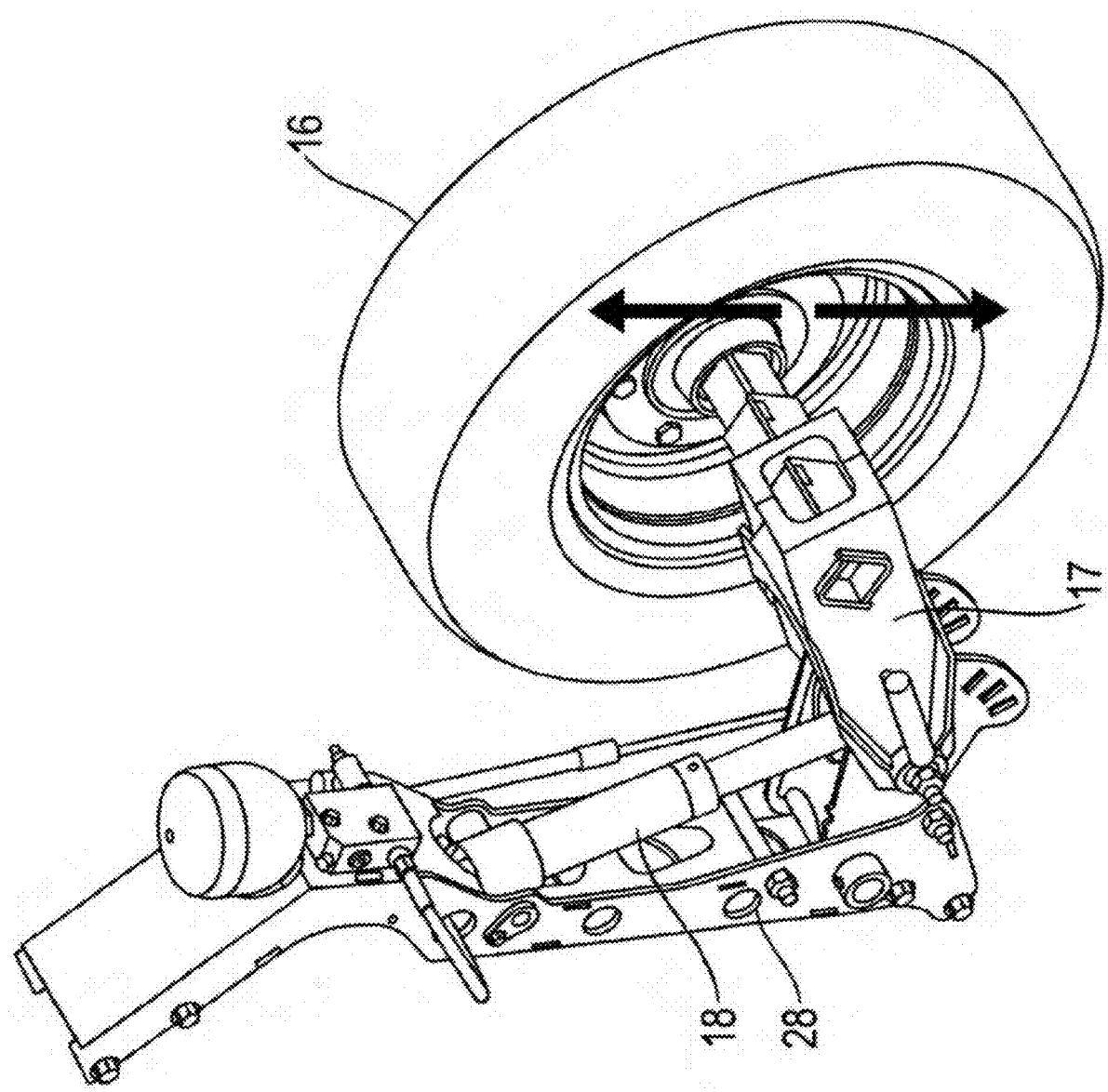
FIG. 3 illustrates a view of a compressible arm with a support wheel.

In one or some embodiments, dampened, compressible arms 15 may be mounted on the bottom side of the attachment 2 adjacent to the side walls 14 on the lateral ends of the attachment 2. As shown in detail in FIG. 3, an end of the arms 15 that touches the ground is formed by a support wheel 16; the support wheel 16 is articulated to a fitting 28 via an arm element 17 shown in an approximately horizontal position. The fitting 28 for its part may be mounted on the rear wall of the attachment 2 such that the end of the arm element 17 articulated to the fitting 28 comes to rest approximately at ground level of the attachment 2, as shown in FIG. 2. In one or some embodiments, the inclination of the arm element 17 may be adjusted by an actuating cylinder 18 that contacts the arm element 17 and a top region of the fitting 28.

In one or some embodiments, a ground distance meter 19 is provided or positioned on each side wall 14. In one or some embodiments, the ground distance meter 19 comprises a wire hoop 20 that is pivotably mounted about an axis 29 on the side wall 14, and a sensor 22 for detecting the angle of rotation of the wire hoop 20 about the axis 29 that represents the distance between the side wall 14 and the ground.

Figure 4:
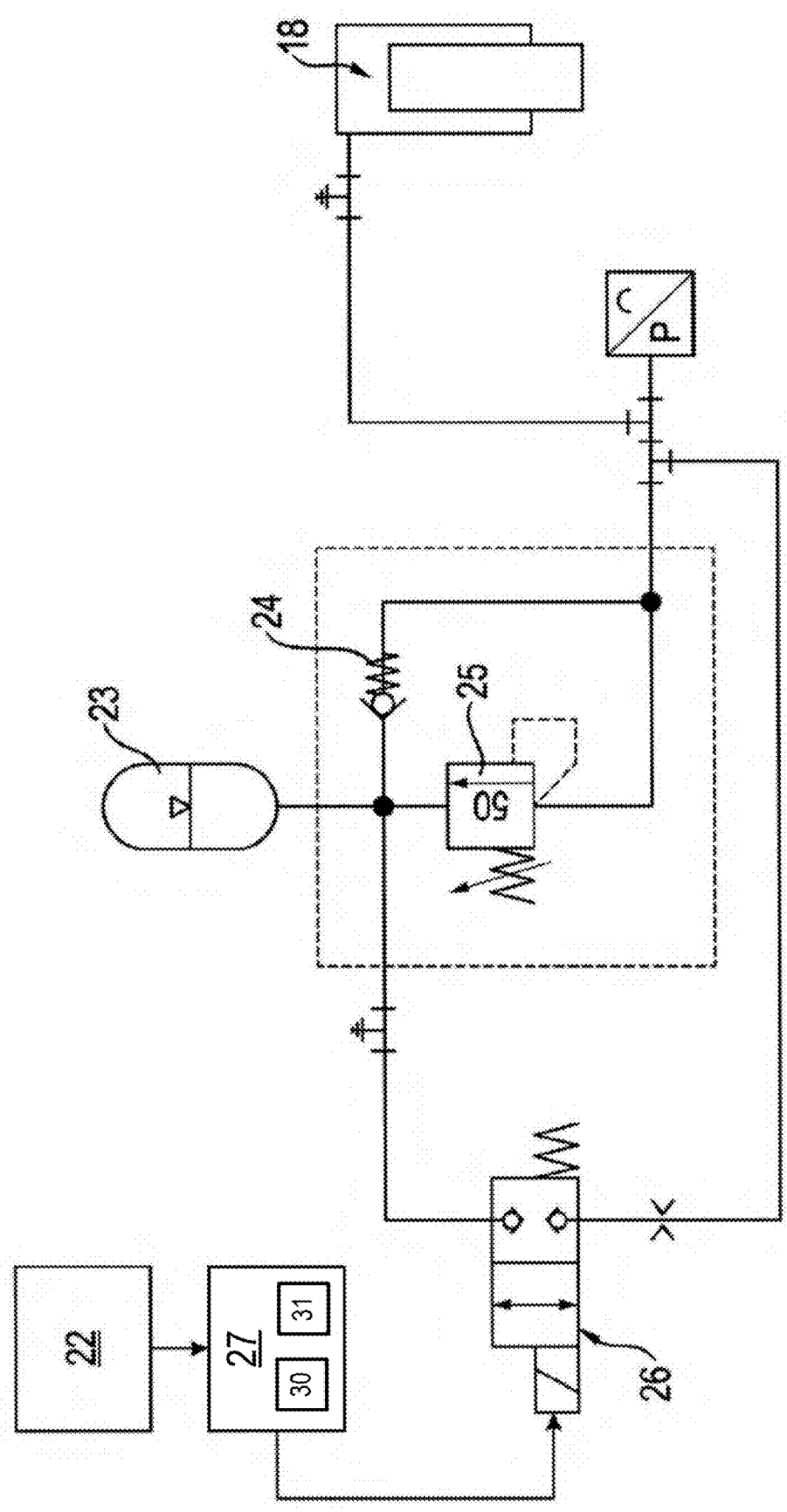
FIG. 4 illustrates a diagram of a hydraulic circuit that connects an actuator cylinder to a dampened arm with a reservoir.

As shown in FIG. 4, a working chamber of the actuating cylinder 18 of one of the arms 15 is connected to a pressure reservoir 23 via a hydraulic circuit in which a check valve 24 which shuts off in the direction from the actuating cylinder 18 to the pressure reservoir 23, and a throttle point, here in the form of a pressure control valve 25, are connected in parallel. In one or some embodiments, an inlet and a control input for the pressure control valve 25 face the actuating cylinder 18 such that, when the pressure therein exceeds that of the pressure reservoir by more than a threshold value set on the pressure control valve 25, hydraulic fluid flows out of the work chamber to the pressure reservoir 23, and the pressure control valve 25 experiences a pressure drop. When the attachment 2 is stimulated to oscillate, the arm 15 may dampen and slow down a downward movement of the side of the attachment 2 that it supports.

When this side of the attachment 2 moves up again, the arm 15 is relieved, and the pressure in the working chamber of the actuator cylinder 18 is so low that hydraulic fluid flows from the pressure reservoir 23 via the check valve 24 into the working chamber and extends the arm 15. The flow rate through the check valve 24 may be high enough that the support wheel 16 of the arm 15 never loses contact with the ground during the upward movement; however, even if the flow rate is lower and contact with the ground is perhaps lost as a result during the upward movement, it will be restored in an early phase of the following downward movement. If, however, the downward movement is strongly dampened from the beginning, it may come to a stop before an equilibrium position is reached, or may at least be slowed down to such an extent that, before the equilibrium position is reached, the attachment is again stimulated to oscillate by traveling over unevenness in the ground.

Even in the event when a pivoting motion of the attachment 2 is intentionally driven with the assistance of the actuators 11 to correct a roll angle that has been detected as incorrect or faulty, a strong damping of the arm 15 may be ill-advised or problematic because it may delay the achievement of the desired roll angle.

In one or some embodiments, to avoid this, a switching valve 26 is included as another component of the hydraulic circuit parallel to the pressure control valve 25 and the check valve 24 between the actuating cylinder 18 and the pressure reservoir 23. In one or some embodiments, a control circuit 27 controls the operating state, open or closed, of the switching valve 26 by using measurement data of the ground distance meter 19.

In one or some embodiments, the control circuit 27 may comprise any type of computing functionality, such as at least one processor 30 (which may comprise a microprocessor, controller, PLA, or the like) and at least one memory 31. The memory 31 may comprise any type of storage device (e.g., any type of memory). Though the processor 30 and memory 31 are depicted as separate elements, they may be part of a single machine, which includes a microprocessor (or other type of controller) and a memory. Alternatively, processor 30 may rely on memory 31 for all of its memory needs.

The processor 30 and memory 31 are merely one example of a control circuit configuration. Other types of control circuit configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples. As discussed in detail below, the control circuit 27 may control of the switching valve 26 depending on comparing the measurement data from the ground distance meter 19 with one or more predetermined thresholds (which may be stored in memory 31).

In particular, the control circuit may control the switching valve 26 associated with one of the arms 15 based on measurement data from the ground distance meter 19 (e.g., exclusively from the measurement data from the ground distance meter 19) which may be arranged or positioned on the same side of the attachment 2 as the switching valve 26 itself. If the height measured by the ground distance meter 19 exceeds a threshold h1 above an equilibrium height h0 (as determined by control circuit 27), then the control circuit 27 is configured to open the switching valve 26 (e.g., send a command or other communication to control switching circuit valve 26 to open). In this regard, the data generated by the ground distance meter 19 is an example of the type of data that may be used to determine the roll angle of the cutting unit. Other sensors (and generated sensor data) are contemplated for determining the roll angle of the cutting unit. Since at the same time hydraulic fluid is already flowing through the check valve into the working chamber of the actuating cylinder 18, this opening has little influence on the flow resistance to be overcome by the hydraulic fluid. The upward movement is therefore not appreciably dampened independent of the position of the switching valve 26; consequently, upward deflections extending far above the equilibrium position are possible, and the following downward movement also initially only remains marginally dampened.

Only when, over the course of a subsequent downward movement, the height measured by the ground distance meter 19 falls below a second threshold h2 between h0 and h1 (as determined by control circuit 27), does the control circuit 27 then close the switching valve 26 (e.g., send a command or other communication to control switching circuit valve 26 to close). In one or some embodiments, a return flow of hydraulic fluid from the actuating cylinder 18 to the pressure reservoir 23 may now only occur via the pressure control valve 25 so that further movement is strongly damped from that point. This ensures that, when damping causes the downward motion to stop, the height at which this occurs is not far from the equilibrium height h0. A small output by the actuators 11 is therefore enough to restore the equilibrium height h0.

In one or some embodiments, since the opening state of the switching valve 26 has scarcely any influence on the upward movement, the first threshold h1 may also be set equal to h2. However, providing a difference between the two may be useful to keep the valve 26 from frequently switching when the height around h1 and h2 fluctuates slowly and at a low amplitude.

In the above description, only one side of the attachment 2 and the arm 15 arranged there has been considered at a time. Since in one embodiment the described control of the switching valve 26 may occur in the same way on both sides L, R of the attachment 2 depending on the height, not only a rolling oscillation of the attachment 2 may be damped, but also an oscillation of the entire attachment 2 in the vertical direction.

According to an alternate embodiment, the control circuit 27 is configured to evaluate measured data from ground distance meters 19 on both sides of the attachment. In this case, it may not be necessary to determine an equilibrium height h0 and set the first and second thresholds h1, h2 at a suitable distance from this equilibrium height h0; rather, it may be sufficient to determine the difference between heights hL, hR measured to the right and left of the middle of the attachment: If this difference exceeds a predetermined amount d1, such as corresponding to a roll angle of the attachment 2 relative to the horizontal of 0.15° or 0.2°, then the control unit 27 is configured to open the switching valve 26 on the higher side L or R of the attachment 2, and is configured to closes it again when the roll angle relative to the horizontal has decreased to a lower value d2, such as to below 0.1°. The rolling motion of the attachment 2 may therefore always be strongly damped only when it is near the horizontal (e.g., less than 5° from horizontal; less than 4° from horizontal; less than 3° from horizontal; less than 2° from horizontal; less than 1° from horizontal; less than 0.5° from horizontal; less than 25° from horizontal), and prolonged dwelling of the attachment in an inclined position with more than 0.1° inclination may be prevented.

In one or some embodiments, controlling by using the height and by using the height difference may be combined with each other.

The above-described controlling of the switching valve 26 by using measured values from the ground distance meters 19 may be linked to controlling the actuators 11. For example, the control circuit 27 may therefore detect, by using the measured values from the ground distance meters 19, whether the roll angle of the attachment lies within a predetermined target range and, if this is not the case, may decide the direction in which the attachment 2 should be pivoted about the axis 21 in order to return the roll angle to its target range, and which one of the two actuators 11 should be extended and which other one of the two actuators 11 should be retracted for this purpose. In one or some embodiments, when and as long as the control circuit 27 actuates one or both actuators 11 to drive a rolling motion, it may simultaneously (e.g., at least partly simultaneously) execute commands or controls to put the arm 15 into a substantially undamped state on the side of the attachment which is lowered by this rolling motion so as to reduce or minimize resistance to the rolling motion.

When or shortly before the attachment 2 has reached the desired roll angle (e.g., as determined by the control circuit 27), the control circuit 27 may stop actuating the actuators 11. At the same time or with a short delay, the control circuit 27 may close the switching valve 26. The control circuit 27 may select the time to close the switching valve 26 in order to take into account the damping realized by the pressure control valve 25 when the switching valve 26 is closed, so that the pivoting motion of the attachment 2 comes to a stop at the desired roll angle.

Further, it is intended that the foregoing detailed description be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

LIST OF REFERENCE NUMBERS

1 Carrier vehicle
2 Attachment
3 Driver's cab
4 Front wheel
5 Inclined conveyor
6 Inlet opening
7 Frame
8 Reel
9 Cross-feeding screw conveyor
10 Joint
11 Actuator
12 Contact point
13 Contact point
14 Side wall
15 Arm
16 Wheel
17 Arm element
18 Actuating cylinder
19 Ground distance meter
20 Wire hoop
21 Axis 22 Sensor
23 Pressure reservoir
24 Check valve
25 Pressure control valve
26 Switching valve
27 Control circuit
28 Fitting
29 Axle
30 Processor
31 Memory

The invention claimed is:

1. An agricultural machine comprising:
a carrier vehicle and an attachment that is pivotably guided on the carrier vehicle about an axis extending in a direction of travel of the carrier vehicle;
at least two support wheels connected, via respective dampened compressible arms, on both sides of the axis to the attachment;
at least one sensor configured to generate sensor data indicative of operation of the attachment; and
a control circuit configured to:
determine, based on the sensor data, whether to modify a pivoting motion of the attachment;
responsive to determining to modify the pivoting motion of the attachment:
determine a change to compressibility of one of the compressible arms; and
send at least one command to change the compressibility of the one of the compressible arms in order to change its compressible state.

2. The agricultural machine of claim 1, wherein the control circuit is configured to send the at least one command to change the one of the compressible arms to switch from a strongly dampened compressible state to a substantially undampened state.

3. The agricultural machine of claim 2, wherein the control circuit is further configured to receive an indicator of roll angle of the attachment;
wherein the control circuit is configured to analyze the indicator of the roll angle to determine whether to modify the pivoting motion of the attachment; and
wherein, responsive to the control circuit determining to modify the pivoting motion of the attachment, the control circuit is configured to send the at least one command to change a state of at least one arm that is compressed by the pivoting motion to switch from the strongly dampened compressible state to the substantially undampened state.

4. The agricultural machine of claim 1, wherein the control circuit is configured to determine the change to the compressibility of the one of the compressible arms by:
determining the compressibility of the other of the compressible arms;
responsive to determining that the other of the compressible arms is in a strongly dampened compressible state, determining to switch the one of the compressible arms to a substantially undampened state.

5. The agricultural machine of claim 1, wherein the control circuit is configured to determine the change to the compressibility of the one of the compressible arms based on a compressible state of another of the compressible arms.

6. The agricultural machine of claim 1, further comprising at least one actuator that contacts the carrier vehicle and the attachment and configured to drive a pivoting motion about the axis between the carrier vehicle and the attachment; and
wherein the control circuit, responsive to determining to modify the pivoting motion of the attachment, is configured to send the at least one command to cause the at least one actuator to change the compressible state of the one of the compressible arms.

7. The agricultural machine of claim 1, wherein the control circuit is configured to send at least one command to change the compressibility by commanding to switch damping of at least one arm from a substantially undampened state to a strongly dampened state over a course of a compressing process thereof.

8. The agricultural machine of claim 7, wherein each of at least two compressible arms comprises an actuating cylinder;
wherein a chamber of the actuating cylinder is connected to a reservoir via a hydraulic circuit;
wherein a flow resistance of the hydraulic circuit is switchable between values corresponding to the substantially undampened state and the strongly dampened state; and
wherein the control circuit is configured to command the switch by commanding the actuating cylinder.

9. The agricultural machine of claim 8, wherein at least one of the at least two compressible arms has an arm element articulated at a first end to the attachment and defines at a second end an axis of one of the at least two support wheels;
wherein the actuating cylinder is articulated to the arm element and to the attachment; and
wherein the control circuit is configured to change the compressibility of the one of the compressible arms by controlling the actuating cylinder.

10. The agricultural machine of claim 8, wherein the hydraulic circuit comprises a throttle point and a switching valve parallel to the throttle point.

11. The agricultural machine of claim 10, wherein the hydraulic circuit furthermore comprises a check valve parallel to the throttle point.

12. The agricultural machine of claim 11, wherein the throttle point comprises a pressure control valve controlled by pressure at its connection facing the actuating cylinder.

13. The agricultural machine of claim 10, wherein the compressible arms are each assigned a ground distance meter that is configured to generate data indicative of distance to a ground; and
wherein the control circuit is configured to modify damping depending on a measured ground distance of at least one of the compressible arms, or a difference between ground distances measured by the ground distance meters on both sides of the axis.

14. The agricultural machine of claim 13, wherein the control circuit is configured to control the switching valve in the hydraulic circuit of one of the compressible arms to open:
when a first threshold is equaled or exceeded by the ground distance measured by the ground distance meter associated with the at least one of the compressible arms; or
when a difference between the ground distance measured by the ground distance meter associated with one arm and the ground distance measured by the ground distance meter on an opposite side of the axis meets or exceeds a first difference threshold; and
wherein the control circuit is configured to control the switching valve in the hydraulic circuit of the one of the compressible arms to close:
when a second threshold is equaled or is less than the ground distance measured by the ground distance meter associated with the at least one of the compressible arms; or when a difference between the ground distance measured by the ground distance meter associated with one arm and the ground distance measured by the ground distance meter on the opposite side of the axis meets or is less than a second difference threshold, and wherein the second threshold is less than the first threshold or where the second difference threshold is less than the first difference threshold.

15. The agricultural machine of claim 1, wherein the at least one sensor is configured to generate sensor data indicative of roll angle of the attachment; and wherein the control circuit is configured to analyze the sensor data indicative of the roll angle in order to determine whether to modify the pivoting motion of the attachment.

16. The agricultural machine of claim 15, wherein the sensor data indicative of the roll angle is based on:

a distance of one side of the attachment to a ground; or a difference of a distance of one side of the attachment to a ground to a distance of an opposite side of the attachment to the ground.

17. The agricultural machine of claim 15, wherein the sensor data indicative of the roll angle is based on:

a ground distance of one side of the attachment to a ground; or a difference of the ground distance of one side of the attachment to a ground to the ground distance of an opposite side of the attachment to the ground;

wherein the control circuit is configured to change the compressibility of the at least one of the compressible arms in a first manner when:

a first threshold is equaled or exceeded by the distance of one side of the attachment to ground; or a difference between the ground distance on the one side and the ground distance on the opposite side meets or exceeds a first difference threshold;

wherein the control circuit is configured to change the compressibility of the at least one of the compressible arms in an opposite manner to the first manner when:

a second threshold is equaled or less than the distance of one side of the attachment to ground; or a difference between the ground distance on the one side and the ground distance on the opposite side meets or is less than a second difference threshold; and wherein the second threshold is less than the first threshold or where the second difference threshold is less than the first difference threshold.

18. The agricultural machine of claim 1, wherein the control circuit is configured to change the compressibility by changing dampening of the one of the compressible arms.

19. The agricultural machine of claim 18, further comprising an actuator; and wherein the control circuit is configured to change the dampening of the one of the compressible arms by controlling the actuator.

20. An agricultural carrier vehicle for use in combination with an attachment, the attachment being pivotably guided on the agricultural carrier vehicle about an axis extending in a direction of travel of the agricultural carrier vehicle, the agricultural carrier vehicle comprising:

a control circuit configured to:

receive, from at least one sensor, sensor data indicative of operation of the attachment, the attachment including at least two support wheels connected, via respective dampened compressible arms, on both sides of the axis to the attachment;

determine, based on the sensor data, whether to modify a pivoting motion of the attachment;

responsive to determining to modify the pivoting motion of the attachment:

determine a change to compressibility of one of the compressible arms; and send at least one command to change the compressibility of the one of the compressible arms in order to change its compressible state.

\* \* \* \* \*